US005628229A

United States Patent [19]

Krone et al.

[11] Patent Number: 5,628,229

[45] Date of Patent: May 13, 1997

[54] METHOD AND APPARATUS FOR INDICATING PUMP EFFICIENCY

[75] Inventors: John J. Krone, Dunlap; Dean E. Miller, East Peoria, both of Ill.

[73] Assignee: Caterpillar Inc., Peoria, Ill.

[21] Appl. No.: 221,135

[22] Filed: Mar. 31, 1994

[51] Int. Cl.[6] .......... G01L 3/26; G01M 19/00

[52] U.S. Cl. .......... 73/168; 364/551.01

[58] Field of Search .......... 73/168; 364/551.01, 364/551.02

[56] References Cited

U.S. PATENT DOCUMENTS

| | | | |
|---|---|---|---|
| 3,350,934 | 11/1967 | Orkney, Jr. et al. | 73/168 |
| 3,921,435 | 11/1975 | Howard | 73/168 |
| 4,781,064 | 11/1988 | Yates | 73/168 |
| 5,050,092 | 9/1991 | Perry | 364/506 |
| 5,388,965 | 2/1995 | Fehn | 73/168 X |

FOREIGN PATENT DOCUMENTS

| | | | |
|---|---|---|---|
| 804856 | 2/1981 | U.S.S.R. | 73/168 |
| 1399503 | 5/1988 | U.S.S.R. | 73/168 |

OTHER PUBLICATIONS

Robert L. Remillard, *Sound and Vibration* Sep. 1985 pp. 20–24 "Data Management System for Predictive Maintenance Programs".

*Primary Examiner*—William A. Cuchlinski, Jr.
*Assistant Examiner*—Willie Morris Worth
*Attorney, Agent, or Firm*—Steven G. Kibby; Steven R. Janda; Thomas J. Bluth

[57] ABSTRACT

An apparatus for indicating efficiency losses in a pump is provided. The apparatus includes a temperature sensor located at the pump input, a second temperature sensor located at a second location, a fluid flow sensor located at the second location, a processor for producing a difference signal in response to signals from the first and second temperature sensors and for quantifying efficiency losses of the pump in response to the difference signal and a signal from the fluid flow sensor. A fault indicator is also provided that is responsive to the efficiency losses.

18 Claims, 7 Drawing Sheets

METHOD AND APPARATUS FOR INDICATING PUMP EFFICIENCY

DESCRIPTION

1. Technical Field

This invention relates generally to an apparatus and method for indicating pump efficiency, and more particularly, to indicating a fault in response to efficiency losses in a pump.

2. Background Art

Many work machines include hydraulic systems for running motors or extending and retracting cylinders. These work machines include hydraulic pumps and/or hydraulic motors having rotating groups that wear over time and eventually fail. If the failure of a pump or motor is catastrophic, substantial debris can be introduced into the hydraulic system causing damage to other components. If, however, an impending failure is predicted or sensed prior to catastrophic failure, the pump or motor can be replaced before damage to other components is caused, The repair can also be scheduled at the most opportune time to reduce productivity losses during repair.

An exemplary rotating group is illustrated in FIG. 1. The rotating group shown is in an axial piston type pump but it should be appreciated by those skilled in the art that the efficiency losses and fluid leakages identified in connection with FIG. 1 have counterparts in virtually any type of rotating group in a hydraulic system, e.g., vane pumps, gear pumps, hydraulic motors.

As a pump begins to wear, volumetric inefficiencies and/or torque inefficiencies increase. Volumetric inefficiencies are typified by fluid leaks around the face of the slipper, the ball socket, the piston wall, port plate barrel interface, and the displacement control device. In the pump shown in FIG. 1, this fluid leakage flows out the case drain. Other types of pumps and motors have similar leakage but the fluid is drained internally.

As fluid is leaked under high pressure through the small passages caused by wear, fluid temperature increases substantially. In the case of externally drained pumps, this is reflected by an increased temperature in the case drain. In the case of internally drained pumps or hydraulic motors, the leaked fluid mixes with fluid being drawn into the component and causes a temperature increase in the discharged fluid.

Torque inefficiencies are caused by friction and drag in the bearings and rotating group interfaces. This type of inefficiency reduces the energy output of the pump or motor in response to a given input of energy and causes additional heat to be produced.

Without any method or apparatus for sensing the increasing inefficiencies as component wear progresses, impending failures cannot be easily predicted and thus the likelihood of catastrophic failures causing damage to other components increases substantially. Likewise, repairs cannot be scheduled for the most opportune time to reduce losses of productivity during repair. Furthermore, the increased leakage leads to decreased productivity and increased fuel consumption that may not be otherwise detected.

The present invention is directed to overcoming one or more of the problems set forth above.

DISCLOSURE OF THE INVENTION

The invention provides a system for indicating the extent of pump wear in response to the amount of efficiency losses.

This information can then be used for purposes of scheduling repairs prior to catastrophic failure and scheduling repairs at the most opportune times that will not interfere with the machine's productivity.

In one aspect of the invention, an apparatus is provided for determining the degree of wear in a pump having an outlet line. The apparatus includes a first temperature sensor producing a reference temperature signal, a second temperature sensor connected to the outlet line which produces an outlet temperature signal, a processor for determining the degree of wear of the pump in response to the reference and outlet temperature signals and for indicating a fault in response to the degree of pump wear.

In another aspect of the invention, a method for determining the wear in a pump is provided and includes the steps of producing a heat transfer signal indicative of the amount of energy converted to heat in response to fluid leakage in the pump, determining the degree of wear of the pump in response to the heat transfer signal, and indicating a fault in response to the degree of wear of the pump.

The invention also includes other features and advantages which will become apparent from a more detailed study of the drawings and specification.

BRIEF DESCRIPTION OF THE DRAWINGS

For a better understanding of the invention, reference may be made to the accompanying drawings, in which.

BEST MODE FOR CARRYING OUT THE INVENTION

Figure 1:
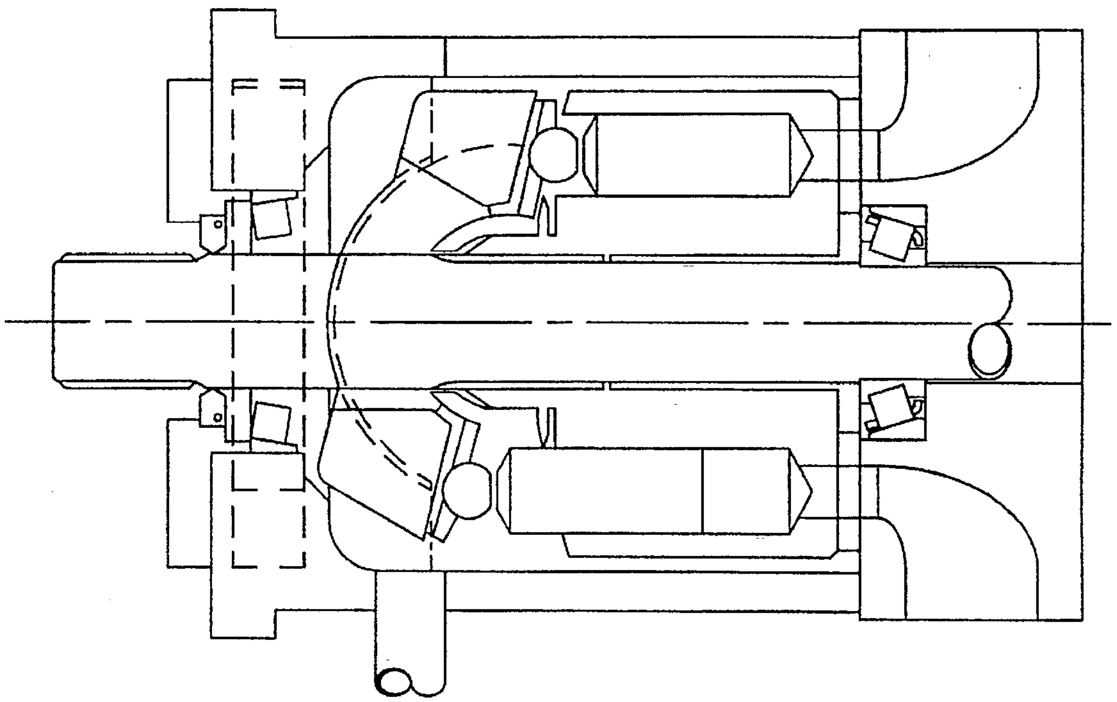
FIG. 1 is an illustration of an axial piston pump having a case drain.
Figure 2:
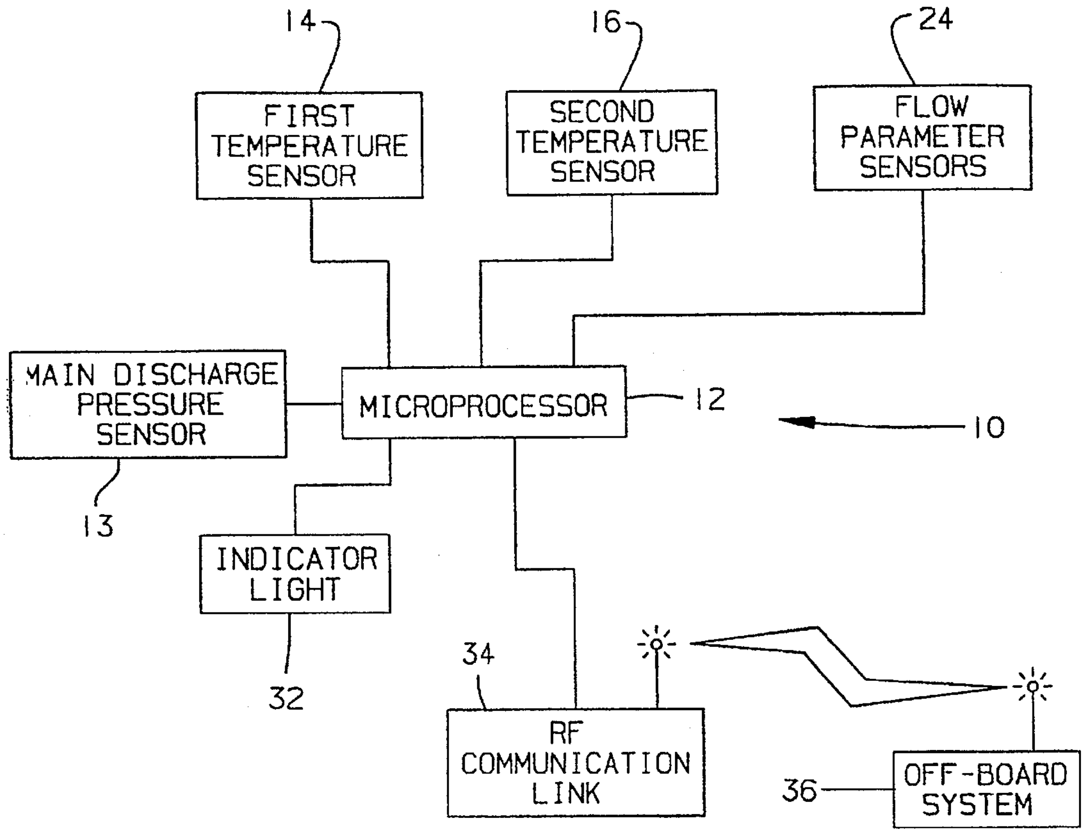
FIG. 2 is a diagrammatic illustration of an embodiment of the invention.

A simple diagrammatic illustration of an embodiment of a hydraulic component wear indicator is shown generally by the reference 10. In the preferred embodiment, a microprocessor 12 is connected to a main discharge pressure sensor 13 and first and second temperature sensors 14,16 which are incorporated in the hydraulic system of a work machine (not shown), such as a hydraulic excavator. The first temperature sensor 14 is positioned to produce a signal indicative of the temperature of fluid entering a hydraulic pump 18. The second temperature sensor 16 is located in an outlet line of the hydraulic pump 18. Depending on the embodiment, the outlet line may be either a main discharge line 20 or a case drain line 22.

While the precise locations of the first and second temperature sensors 14,16 are not critical, it should be understood that since the invention depends upon a relatively accurate indication of fluid temperature increases caused by the pump 18, the temperature sensors 14,16 should be located to minimize extrinsic influences on the difference between the two temperature readings. This consideration generally argues for positioning the temperature sensors 14,16 near the hydraulic pump 18. In the preferred embodiment, the first and second temperature sensors are thermistors of a type well-known in the art.

Figure 5:
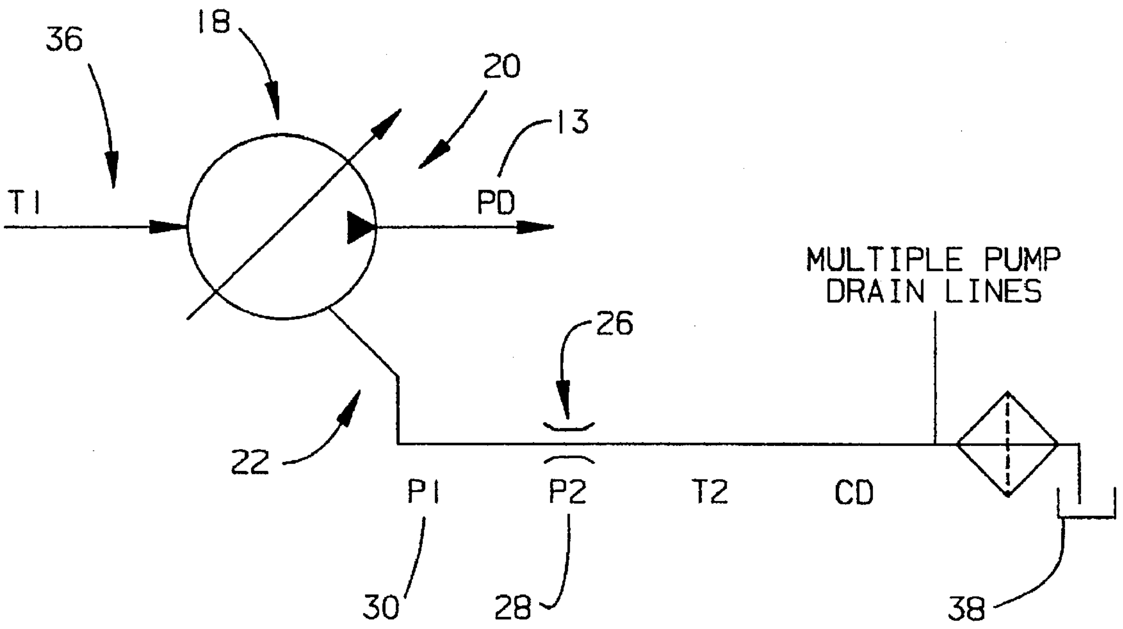
FIG. 5 illustrates a model of the invention including a pump having an external case drain.
Figure 6:
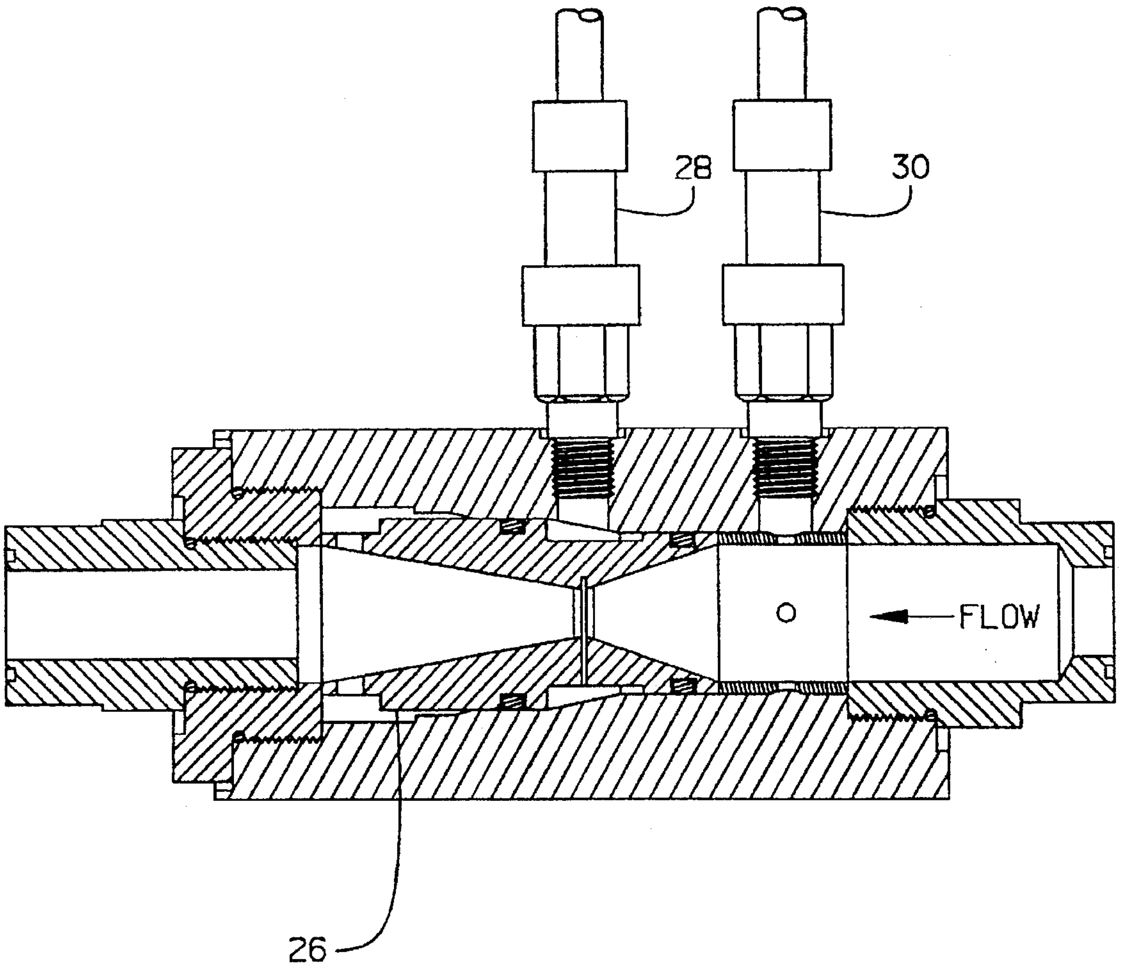
FIG. 6 is an illustration of a venturi and pressure sensor arrangement.

When the invention is used in connection with an externally drained pump, the microprocessor 12 is also connected to a device 24 for providing flow parameter information related to fluid in the case drain line 22. In the preferred embodiment, the flow device 24 includes a venturi 26 and a pair of venturi pressure sensors 28,30 the locations of which are indicated in FIG. 5 by the designations P1 and P2. In the preferred embodiment, the main discharge pressure sensor 13 and the venturi pressure sensors 28,30 are pulse-width modulated pressure sensors of a type well-known in the art producing signals having duty cycles proportional to sensed pressure levels. It should be understood that the pair of venturi pressure sensors 28,30 can be replaced by a single differential pressure signal measuring the pressure drop in the venturi 26.

The microprocessor 12 produces a fault indication in response to received sensor data if certain conditions are met. The fault indication is stored as a flag indicating that the pump is becoming excessively worn. In addition, an indicator light is illuminated in the operator compartment in a manner well-known in the art. For example, a light may be illuminated including the message "service hydraulic system soon." The stored flag may also be accessed by a service tool (not shown) of a type well-known in the art for downloading service and diagnostic information. Similarly, the flag may be sent to a remote location 34 via a RF communication link 36 known in the art.

Figure 3:
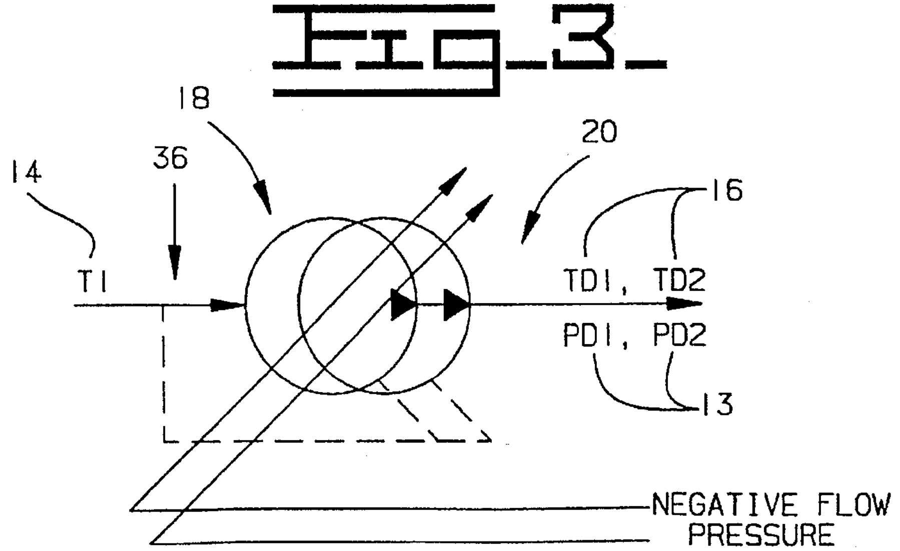
FIG. 3 illustrates a model of the invention having two rotating groups and an internally drained pump.

Referring primarily to FIG. 3, one embodiment of the invention is illustrated in connection with an internally drained hydraulic pump having two rotating groups and two main discharge lines 20 An example of a hydraulic pump of this type is available from Mannesmann Rexroth Hydromatik GMBH under part no. 434839. The hydraulic pump has a pair of main discharge lines 20 and an inlet line 36 connected to a hydraulic tank (not shown). The location of the first temperature sensor 14 is shown by the designation T1. In this embodiment, there are two second temperature sensors 16, designated in FIG. 3 as TD1 and TD2. The two second temperature sensors 16 are required since there are two main discharge lines 20.

There are also two main discharge pressure sensors 13 for the two main discharge lines and are indicated in FIG. 3 as PD1 and PD2. In the preferred embodiment, the electrical signals from the main discharge pressure sensors 13 are delivered to the microprocessor 12 along with signals from the first and second temperature sensors 14,16.

Figure 4:
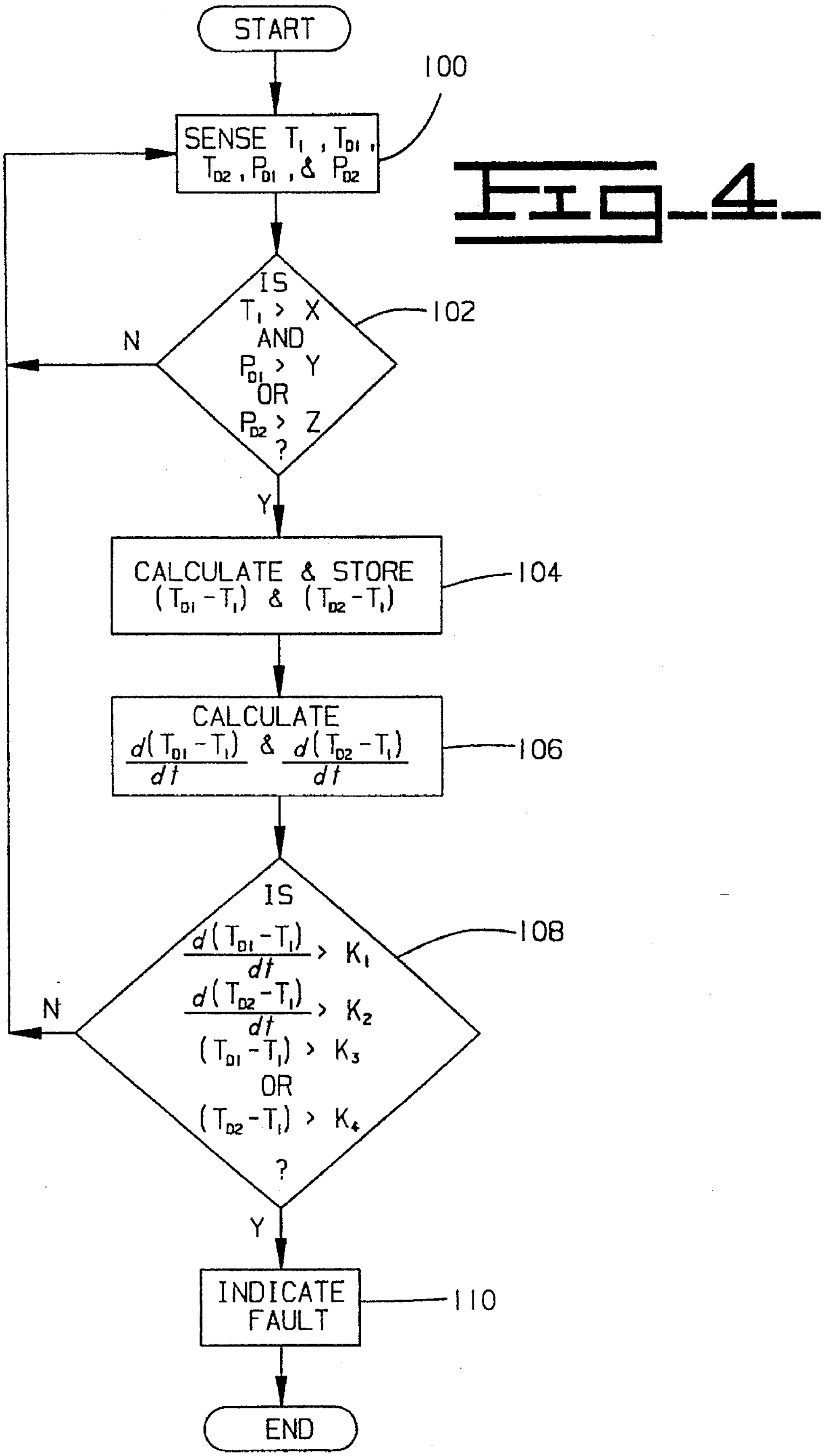
FIG. 4 illustrates a flow chart of an algorithm used in connection with an embodiment of the invention.

Turning now to FIG. 4, a flow chart of an algorithm used in connection with an embodiment of the invention is illustrated. The microprocessor 12 receives signals 100 from the first temperature sensor 14, the two main discharge pressure sensors PD1, PD2, and the two outlet temperature sensors TD1, TD2.

The microprocessor 28 compares the two main discharge pressures and the inlet temperature to respective constants. If the sensed inlet temperature and one of the two discharge pressures are above their respective constants, the algorithm proceeds to block 104. The constants are selected to indicate the standard operating state of the pump. Thus data for which warnings are to be produced are only examined while the pump is in a predefined operating state. This ensures that the sensed data is comparable. For example, when the hydraulic system is first activated, the temperature differences indicated may not be truly comparable to temperature differences sensed when the pump is in the standard operating state. It should be understood that maximum values could also be used so that sensor information is disregarded when discharge pressure or inlet temperature is top high.

If the pump is in the standard operating state, the temperature differences are calculated at step 104 in response to the signals from the inlet and outlet temperature sensors 14,16. The calculated temperature differences are stored in a memory device (not shown) associated with the microprocessor 12. The stored temperature differences are then used to derive a best-fit equation associated with each of the discharge lines 20 using a standard regression technique such as least-squares. Each best-fit equation is used to calculate the rate of change in the associated differences at block 106. The calculated rates of change are also stored in memory.

If one of the temperature differences or rates of change exceed respective constants at block 108, the microprocessor 12 produces an electrical signal to indicate a fault at block 110. As set forth above, the constants are selected to identify the degree of acceptable wear and to predict impending failure. The precise values are selected by the system designer based on empirical test data relating to temperature differences versus pump wear. The values are selected to indicate a fault when the desired amount of wear is achieved and to indicate impending catastrophic failures. If the thresholds are too low, the pump will be replaced or repaired when it still has a substantial useful life; however, if the thresholds are too high, there is an increased risk of failure.

Turning now to FIG. 5, an embodiment of the invention used in connection with an externally drained pump is shown. An external case drain 22 provides a conduit for fluid to flow from the pump case to the hydraulic tank 38. As explained in connection with FIG. 1, flow through the case drain 22 increases as the pump wears. Similarly, the difference in fluid temperature between the inlet fluid and fluid in the case drain 22 increases as torque inefficiencies increase. At some threshold level, the pump is considered worn out and replacement should proceed at the next available servicing. Similarly, if the magnitude of flow or temperature difference is increasing at a substantial rate, this could indicate an impending catastrophic failure.

The locations of sensors used in connection with an externally drained pump are shown in FIG. 5. The first and second temperature sensors are shown by the designations T1 and T2 and the main discharge pressure sensor 13 is indicated by the designation PD. The venturi pressure sensors 28,30 are identified in FIG. 5 by P1 and P2.

The fluid from the case drain line 22 advantageously flows from the venturi 34 to a contamination indicator identified by the designation CD and is combined with fluid from other pump case drains before flowing back to the hydraulic tank 38 via a filter.

Figure 7:
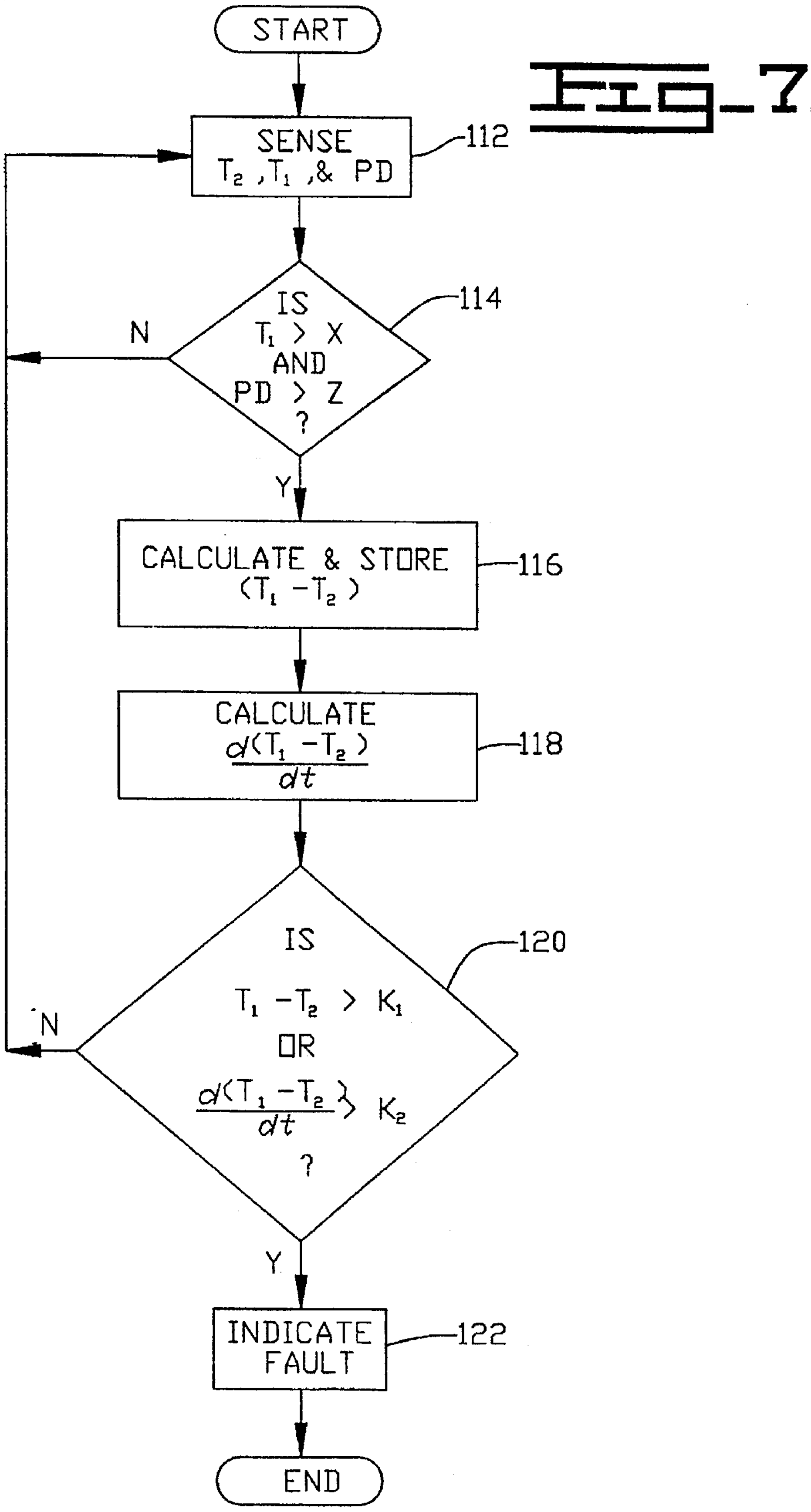
FIG. 7 illustrates a flow chart of an algorithm used in connection with an embodiment of the invention.

Turning now to FIG. 7, a flow chart of an algorithm used in connection with an embodiment of the invention is illustrated. The microprocessor 12 receives signals 112 from the first and second temperature sensors 14,16 and main discharge pressure sensor 13.

The microprocessor 12 compares the main discharge pressure and the inlet temperature to respective constants at block 114. As described above, the constants are selected to indicate the standard operating state of the pump. If the sensed inlet temperature and sensed discharge pressure are above their respective constants, control is passed to block 116. Thus data for which warnings are to be produced are only examined while the pump is in a predefined operating state. It should be understood that maximum values could also be used so that case drain flows are disregarded when discharge pressure or inlet temperature is too high.

If the pump is in the standard operating state, the difference between the inlet and outlet temperatures is calculated and stored at block 116. The stored differences are then used to derive a best-fit equation using a standard regression technique such as least-squares. The best-fit equation is used to calculate the rate of change in the temperature difference at block 118. The rate of change is also stored in memory.

If either the temperature difference or the rate of change of the difference exceed respective constants, the microprocessor 28 produces an electrical signal to indicate a fault at block 122. As set forth above, the constants are selected to identify the degree of acceptable wear and to predict impending failure. The precise values are selected by the system designer based on empirical test data relating to case drain flow versus pump wear. The values are selected to indicate a fault when the desired amount of wear is achieved and to indicate impending catastrophic failures. If the thresholds are too low, then the pump will be replaced or repaired when it still has a substantial useful life; however, if the thresholds are too high, then there is an increased risk of failure.

Figure 8:
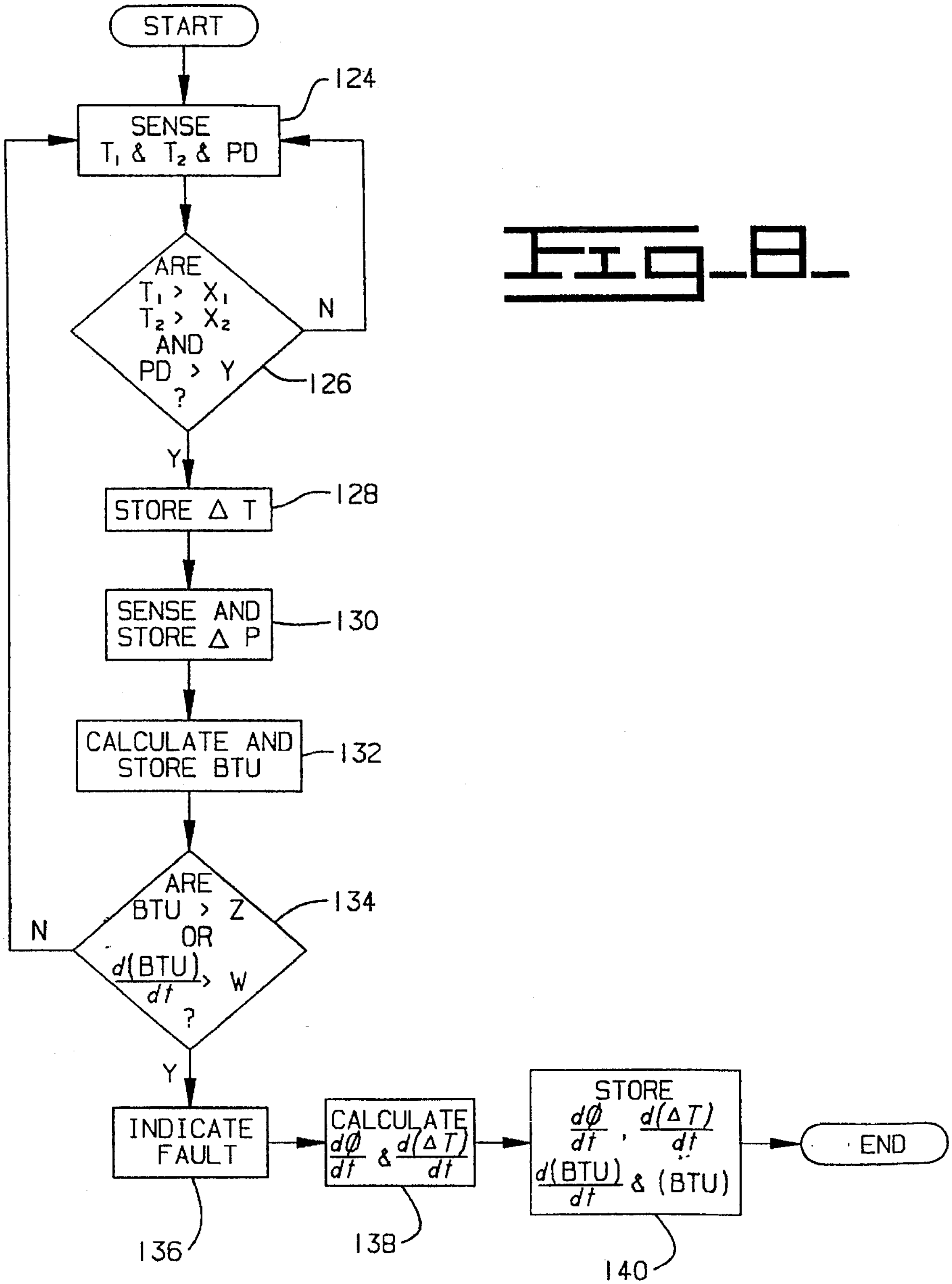
FIG. 8 illustrates a flow chart of an algorithm used in connection with yet another embodiment of the invention.

Turning now to FIG. 8, a flow chart of an algorithm used in connection with an alternative embodiment of the invention is illustrated. The microprocessor 12 receives signals 124 from the main discharge pressure sensor 13 and the inlet and outlet temperature sensors 14,16.

The microprocessor 12 compares the inlet and outlet temperatures and the main discharge pressure to respective constants at block 126 as described above. The constants are selected to indicate the standard operating state of the pump. If the inlet and outlet temperatures and sensed discharge pressure are above their respective constants, control is passed to block 128. It should be understood that maximum values could also be used so that case drain flows are disregarded when discharge pressure or inlet temperature is too high.

If the pump is in the standard operating state, the difference between the inlet and outlet temperatures is stored in the memory device (not shown) associated with the microprocessor 12. The difference in pressures measured by the venturi pressure sensors 28,30 are also stored in memory at block 130. The flow rate of fluid in the case drain 24 is calculated in response to the signals from the venturi pressure sensors 28,30 in a manner well-known in the art of fluid dynamics. The mass flow of fluid in the case drain is a function of flow rate, the diameter of the case drain, and specific weight of the fluid and is calculated by the microprocessor 12. The calculated flow rates and mass flows are stored in the memory device associated with the microprocessor 12. The stored temperatures and flow rates are then used by the microprocessor 12 to calculate the energy loss from the pump via the case drain 22. The following equation is used to calculate energy loss:

$$BTU/min = c_v\ m\ (delta\ T)$$

Where:

BTU/min is the amount of power;

$c_v$ is a fluid constant;

m is the mass flow; and delta T is the difference between inlet and outlet temperatures.

The power calculations are stored and used to derive a best-fit equation using a standard regression technique such as least-squares. The best-fit equation is used to calculate the rate of change in the magnitude of power loss at block 132. The rate of change is also stored in memory.

If either the power loss or the rate of change of power loss is determined to exceed respective constants at block 134, the microprocessor 12 produces an electrical signal to indicate a fault 136. As set forth above, the constants are selected to identify the degree of acceptable wear and to predict impending failure. The precise values are selected by the system designer based on empirical test data relating to case drain flow versus pump wear. The values are selected to indicate a fault when the desired amount of wear is achieved and to indicate impending catastrophic failures. If the thresholds are too low, then the pump will be replaced or repaired when it still has a substantial useful life; however, if the thresholds are too high, there is an increased risk of failure.

The stored flow and temperature differences are used to calculate rates of change for these respective values which are also stored in memory at blocks 138 and 140. The stored temperature differences, flows, and rates of change are available for download via either a service tool or the RF communication link. Once downloaded, the data is analyzed to determine trends in the data. This trend information aids service personnel in diagnosing the cause of wear by recognizing which of the two parameters are contributing more to the increasing efficiency losses.

While the invention has been described in connection with pumps, it should be understood that the invention is equally applicable to other components, such as hydraulic motors.

INDUSTRIAL APPLICABILITY

In operation, the present invention is used on a work machine having hydraulically operated implements to predict impending failure of a hydraulic pump or motor. The sensed data is used to predict an impending failure to allow replacement of the component before damage to other components is caused. The repair can also be scheduled at the most opportune time to reduce productivity losses during repair.

The temperature sensors produce signals that are used to calculate efficiency losses in the pump or motor. The level of efficiency loss and its rate of change are then used by a processor to produce a fault indication if a failure is expected or the pump is becoming excessively worn. The fault indication may take the form of illuminating a warning light in the operator compartment instructing the operator to have the hydraulic system serviced soon. Likewise, the fault indication may be a flag being stored in the processor to indicate the existence of a problem with the hydraulic pump. The flag could then be accessed by a service tool being connected to the processor when the machine is undergoing routine service. Alternatively, the flag could be transmitted to a remote location via a radio link to indicate the impending failure to management or service personnel.

Other aspects, objects, and advantages of this invention can be obtained from a study of the drawings, the disclosure, and the appended claims.

We claim:

1. An apparatus for determining the degree of wear in a pump having an outlet line, comprising:

a first temperature sensor adapted to produce a reference temperature signal;

a second temperature sensor connected to the outlet line, said second temperature sensor being adapted to produce an outlet temperature signal; and means for determining whether the pump is in a predefined operating state responsive to a said temperature signal, calculating a temperature difference between said reference and outlet temperature signals in response to the pump being in said predefined operating state and indicating a fault in response to said difference exceeding a fault level.

2. An apparatus, as set forth in claim 1, said means further calculating a rate of change of said difference, comparing said rate of change to a second fault level and indicating a fault in response to said rate of change exceeding said second fault level.

3. An apparatus, as set forth in claim 1, wherein, said outlet line is a main discharge line of the pump said first temperature sensor is connected to an inlet line of the pump and the second temperature sensor is connected to the main discharge line of the pump.

4. An apparatus, as set forth in claim 3, wherein the pump includes a third temperature sensor connected to a second outlet line and being adapted to produce a second outlet temperature signal; and said means further calculating a second temperature difference between said reference and second outlet temperature signals, and indicating a fault in response to said second difference exceeding a second fault level.

5. An apparatus for determining the energy loss in a pump, comprising:

means for measuring a temperature indicative of the input temperature of a pumped fluid and producing a first temperature signal;

means for measuring the fluid temperature at a second location and producing a second temperature signal;

means for producing a flow signal indicative of the amount of fluid flow at said second location;

processing means for calculating a difference between said first and second temperature signals when the pump is in a predefined operating state, said processing means quantifying efficiency losses of the pump from said difference and said flow signal and indicating a fault in response to said efficiency losses exceeding a predetermined level.

6. An apparatus, as set forth in claim 5, wherein the pump includes a case drain and said second location is in said case drain.

7. An apparatus, as set forth in claim 6, wherein said means for producing a flow signal indicative of the amount of fluid flow includes a venturi.

8. An apparatus, as set forth in claim 6, wherein said processing means for quantifying efficiency losses includes means for calculating the mass flow rate in response to said flow signal and producing a pump power loss signal by multiplying said difference by said mass flow rate.

9. An apparatus, as set forth in claim 8, said processing means further including means for comparing said pump power loss signal with a predetermined constant and indicating a fault in response to said pump power loss signal exceeding said predetermined constant.

10. An apparatus for determining the energy loss in a pump, comprising:

means for measuring the input temperature of a pumped fluid and producing a first temperature signal;

means for measuring the fluid temperature at a second location and producing a second temperature signal;

means for producing a flow signal indicative of the amount of fluid flow at said second location; and processing means for producing a difference signal representative of a temperature difference between said first and second temperature signals, producing a loss signal in response to said difference signal and said flow signal, said loss signal quantifying pump efficiency losses, calculating the rate of change of said loss signal and indicating a fault in response to the level and rate of change of said loss signal.

11. An apparatus, as set forth in claim 10, said processing means further including means for calculating the rate of change of said difference signal and said flow signal.

12. An apparatus, as set forth in claim 10, wherein the pump includes a case drain and said second location is in said case drain.

13. An apparatus, as set forth in claim 12, wherein said means for producing a signal indicative of the amount of fluid flow includes a venturi.

14. A method for determining energy loss in a pump, comprising the steps of:

measuring the input temperature of a pumped fluid and producing a first temperature signal;

measuring a fluid temperature at a second location and producing a second temperature signal:

determining the amount of fluid flow at said second location in response to a signal indicative of fluid flow rate;

determining from a said temperature signal whether the pump is in a predefined operating state; and producing a difference signal representing a temperature difference between said first and second temperature signals and quantifying efficiency losses of the pump using said difference signal and said flow signal, in response to the pump being in said predefined operating state.

15. A method, as set forth in claim 14, wherein the pump includes a case drain and said second location is in said case drain.

16. A method, as set forth in claim 15, wherein said step of determining the amount of fluid flow includes the step of measuring the pressure drop in a venturi.

17. A method, as set forth in claim 15, wherein said step of quantifying efficiency losses includes the steps of calculating the mass flow rate in response to said flow signal and producing a pump power loss signal by multiplying said difference signal by said mass flow rate.

18. A method, as set forth in claim 17, including the steps of comparing said pump power loss signal with a predetermined constant and indicating a fault in response to said pump power loss signal exceeding said predetermined constant.

* * * * *